United States Patent [19]

Hüttlin

[11] Patent Number: 4,587,744
[45] Date of Patent: May 13, 1986

[54] FLUIDIZED BED APPARATUS

[76] Inventor: Herbert Hüttlin, Lörracher Strasse 14, 7853 Steinen, Fed. Rep. of Germany

[21] Appl. No.: 617,089
[22] PCT Filed: Sep. 21, 1983
[86] PCT No.: PCT/EP83/00247
§ 371 Date: May 18, 1984
§ 102(e) Date: May 18, 1984
[87] PCT Pub. No.: WO84/01113
PCT Pub. Date: Mar. 29, 1984

[30] Foreign Application Priority Data

Sep. 21, 1982 [DE] Fed. Rep. of Germany ....... 3234911

[51] Int. Cl.⁴ ............................................. F26B 17/00
[52] U.S. Cl. .................................. 34/57 R; 34/57 A; 34/57 E; 366/101
[58] Field of Search ............... 34/57 A, 57 R, 57 E; 366/101, 102, 106, 107; 118/19, 20, 24, 62, 303

[56] References Cited

U.S. PATENT DOCUMENTS

| | | |
|---|---|---|
| 2,674,498 | 4/1954 | Thayer . |
| 2,708,142 | 5/1955 | Donovan . |
| 3,028,681 | 4/1962 | Jorman et al. ........................ 34/57 E |
| 3,334,868 | 8/1967 | Lage . |
| 3,385,724 | 5/1968 | Grün . |
| 3,386,182 | 6/1968 | Lippert ................................. 118/303 |
| 3,818,605 | 6/1974 | Glatt ..................................... 34/57 E |
| 4,002,325 | 1/1977 | Herfeld . |
| 4,050,406 | 9/1977 | Reni ..................................... 118/303 |
| 4,052,149 | 10/1977 | Stiling ................................. 34/57 E |
| 4,168,914 | 9/1979 | Larson . |

FOREIGN PATENT DOCUMENTS

| | | |
|---|---|---|
| 872928 | 2/1953 | Fed. Rep. of Germany . |
| 960821 | 6/1957 | Fed. Rep. of Germany . |
| 38538 | 1/1960 | Fed. Rep. of Germany . |
| 1849891 | 2/1962 | Fed. Rep. of Germany . |
| 1297447 | 6/1969 | Fed. Rep. of Germany . |
| 2299903 | 3/1976 | France . |

Primary Examiner—Albert J. Makay
Assistant Examiner—David W. Westphal
Attorney, Agent, or Firm—Brumbaugh, Graves, Donohue & Raymond

[57] ABSTRACT

A plunger pipe (40) connectable to a gas source projects axially from above into a container (10) which is rotationally symmetrical with respect to a vertical container axis (A). A dish (16) is arranged below the plunger pipe (40) to deflect the gas supplied through the plunger pipe (40) in upward direction so as to move the material (C) contained in the container (10). In an upper area of the container (10) a deflector shield (56) is arranged around the plunger pipe to deflect the material (C) entrained upwardly by the gas in outward direction. A gas outlet opening (26) is disposed above the deflector shield (56) which is permeable to gas at least in some areas. The apparatus is suitable for mixing, drying, granulating, pelleting, polishing, and/or coating pulverous or granular material.

8 Claims, 7 Drawing Figures

FLUIDIZED BED APPARATUS

The invention relates to a fluidized bed apparatus for mixing, drying, granulating, pelleting, polishing and/or coating pulverous or granular material, comprising a container which is at least apparoximately rotationally symmetrical with respect to an at least approximately vertical container axis, a plunger pipe projecting axially from above into the container and connectable to a gas source, a dish disposed below the plunger pipe to deflect gas entering through the plunger pipe in upward direction so as to move the material in the container, in particular to fluidize it, a deflector shield disposed at least approximately in rotational symmetry all around the plunger pipe in an upper area of the container to deflect the material entrained upwardly by the gas in outward direction, and a gas outlet opening disposed above the deflector shield.

In a known fluidized bed apparatus of this kind (DE-PS No. 872 928) the deflector shield is embodied by a circular, substantially flat baffle plate, the outer edge of which is bent obliquely in a downward direction and positioned close to the wall of the container in such manner that an annular gap is formed between the two. The material entrained by the gas in upward direction around the plunger pipe is distributed by the deflector shield from the center toward all sides like a fountain so that it will settle again in the container without requiring any special space for a bulk material cone forming. The gas flows upwardly around the outer edge of the deflector shield and through the annular gap into the suction nozzle of a blower by which it is again pressed into the container through the plunger pipe.

This known deflector shield is hardly suited to provide the desired uniform settling of the material. Still less is it possible to obtain thorough and yet gentle circulation of the material. If at all, it is obtainable only with exceptionally easily movable material. If vigorous gas flow is produced to convey specifically heavy material upwardly along the outside wall of the plunger pipe, the material will hit the deflector shield at considerable energy and thus may be altered undesirably. A strong gas flow is developed in the annular gap between the outer edge of the deflector shield and the container wall and it may entrain quite considerably quantities of smaller particles of the material. If one attempts to avoid the undesired effects of a strong gas flow by letting the gas flow more slowly, then very soon a status will be established at which it will no longer be possible to convey sufficient quantities of material in upward direction, particularly material which is difficult to treat to that uniform and quick treatment of the material no longer is obtainable.

It is, therefore, the object of the invention to develop a fluidized bed apparatus of the kind specified such that gentle and, at the same time, quick and uniform treatment of the most varied kinds of pulverous or granular material will be possible.

This object is met, in accordance with the invention, in that the deflector shield is permeable to gas at least in individual areas.

In this manner the gas flow which has conveyed the material upwardly along the plunger pipe will separate gradually from the material since the gas can flow upwardly through the permeable areas of the deflector shield, rather than being forced to flow as far as into the vicinity of the outer container wall and then pass upwardly at rather high velocity through an annular gap. The areas of the deflector shield which are permeable to gas may be so designed and arranged that gas will pass through them at moderate velocity while the material is being held back, without being damaged, by the deflector shield.

The gas-permeable areas of the deflector shield in accordance with the invention permit the design of preferred embodiments with which the deflector shield extends radially outwardly to an upper container edge.

In such embodiments, preferably the deflector shield forms a vault having a circular apex whose apex diameter corresponds at least approximately to the mean value of the diameters of the plunger pipe and the upper container edge. The result of this design of the deflector shield is that the material carried upwardly by the gas flow along the plunger pipe will be directed gently outwardly and finally downwardly. The flow velocity of the gas which gradually flows out in an upward direction is so low that the gas cannot carry any greater quantities of dust-like particles upwardly from the material and out of the treatment space as defined by the deflector shield of the container.

To be permeable to gas, the deflector shield may comprise elongated recesses, each having at least an approximately radial longitudinal axis.

Such recesses each may contain a screen insert bent in Vee along the longitudinal axis of the recess. The screen inserts also may be so designed that the entire deflector shield forms a substantially smooth vault. However, inserts of V-shaped cross section have the advantage that their effective surface area is greater than that of the associated recess. The surface area which is thus increased by the screen inserts permits the gas to leave the treatment space of the fluidized bed apparatus in upward direction at a particularly low velocity.

It is convenient to have a downwardly extending apron delimit each recess, particularly if the recesses do not contain screen inserts.

Preferably a fin extending upwardly along the plunger pipe terminates close to the longitudinal axis of each recess so as to direct the material flowing upwardly into the areas of the deflector shield located between the recesses. Such fins prevent individual parts of the material from hitting the edges of the screen inserts, if provided. The fins also may be so designed as to deflect the material totally out of the area of the recesses of the deflector shield so that screen inserts in the recesses may be dispensed with.

Preferably the fins each have a radial extension which progresses gradually along the plunger pipe from the bottom to the top. In this manner the fins will begin gradually to direct the material which flows upwardly along the plunger pipe, not giving the material a chance to impinge on the fins.

If the fins are helical, this will provide the additional advantage of further improving the circulation and thorough mixing of the material.

In accordance with a variant of the embodiment of the deflector shield including individual oblong recesses, the major part of the deflector shield is of screen-like structure.

The invention will be described further, by way of example, with reference to the accompanying diagrammatic drawings, in which.

Figure 1:
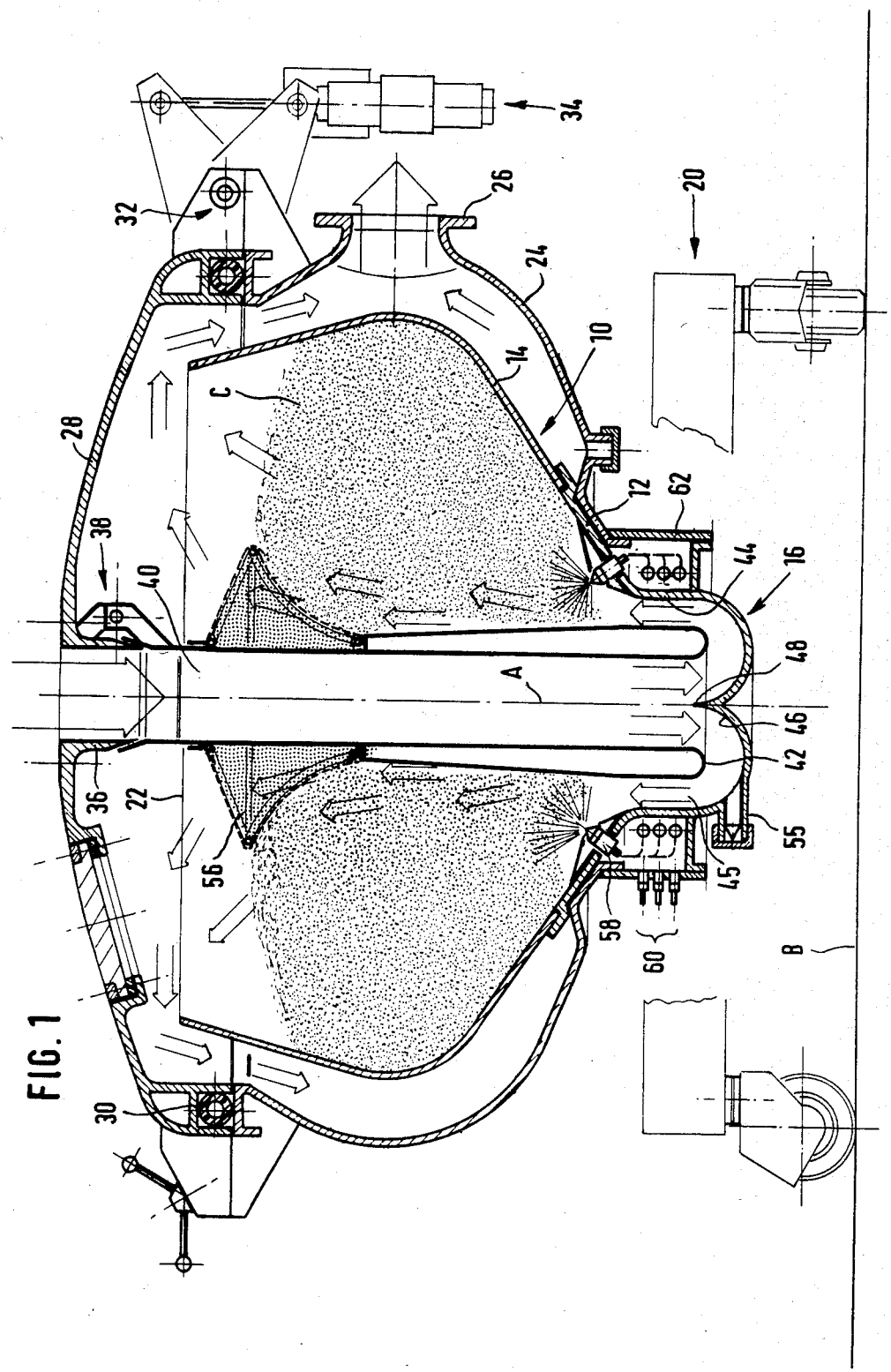
FIG. 1 is an axial section through a first embodiment of a fluidized bed apparatus according to the invention.

The fluidized bed apparatus shown in FIG. 1 comprises a container 10 which is rotationally symmetrical with respect to a vertical container axis A and composed of an annular lower part 12 and a container insert 14. The lower part 12 tapers frustoconically in downward direction, opening without any setoff or step into a bowl or dish 16 which likewise is rotationally symmetrical with respect to the container axis A. The container 10 is transportable by a lift car 20 of substantially conventional design.

The container insert 14 flares upwardly from the lower part 12, at the same cone angle, reaching its maximum diameter approximately at half the height of the container level. From that level on, the container insert 14 is slightly converging toward a horizontal upper container edge 22.

A jacket 24 which annularly encloses the container insert 14, terminates in a horizontal plane just below the container edge 22, and includes a lateral gas outlet opening 26 is fixed to the lower part 12. The jacket 24 is closed at the top by a container lid 28 which forms an arch spaced from the container edge 22 and is sealed with respect to the jacket 24 by a tubular seal 30.

The jacket 24 and container lid 28 are interconnected by a hinge 32 having a horizontal pivot axis and by a piston and clyinder unit 34 spaced from the hinge. The connection is such that the container lid 28 is pivotable in upward direction into an at least approximately vertical position.

The container lid 28 comprises a central inlet nozzle 36 from which a plunger pipe 40 is suspended by a hinge 38 so as to be aligned with the inlet nozzle 36 when the container lid 28 is in its closed position shown. Upon upward pivoting of the container lid 28, the plunger pipe 40 becomes displaced upwardly substantially in parallel with itself, approaching the hinge 32 of the container lid.

In its lower end zone the plunger pipe 40 comprises a marginal bead 42 formed by the lower end of a substantially rigid shell of the plunger pipe 40. Together with a substantially cylindrical wall 44 of the dish 16 into which the plunger pipe 40 is immersed, the marginal bead 42 defines an annular space 45.

Figure 2:
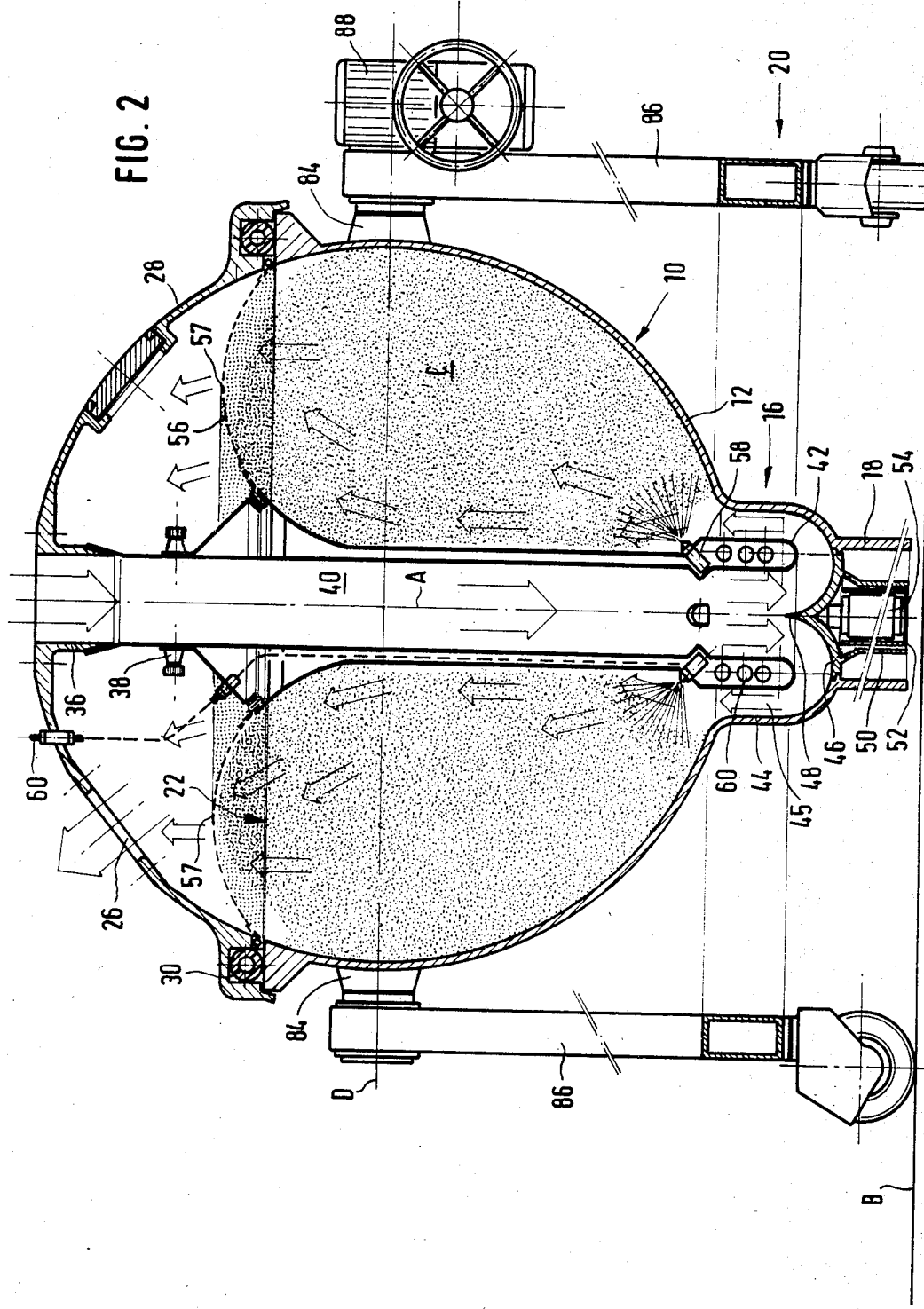
FIG. 2 is an axial section through a second embodiment.

The dish 16 has a central bottom zone 46 which is formed with an axially upwardly protruding tip 48. The bottom zone 46 may be inserted as a separate structural member in the dish 16, as shown in FIG. 2. In this event an outer guide tube 50 is formed at its underside and guided for axial displacement in an inner guide tube 52 which is fixed to a foot 18. A piston and cylinder unit 54 is disposed inside the inner guide tube 52 to permit the central bottom zone 46 to be raised so that it will at least almost touch the marginal bead 42, uncovering a discharge opening in the center of dish 16. If the dish 16 is formed in one-piece, as shown in FIG. 1, however, it may comprise a tangentially positioned discharge nozzle 55 at its bottom, as demonstrated in FIG. 1.

A mushroom-shaped deflector shield 56 is fixed to the plunger pipe 40, slightly spaced below the plane of the container edge 22. As shown in FIG. 1, the deflector shield 56 is formed by a screen-like apertured sheet of stainless steel and has an outer diameter which is a little smaller than half the diameter of the upper container edge 22.

By contrast, in FIG. 2 the deflector shield 56 is largely made of screen-like fabric, extending across the entire space between the plunger pipe 40 and the container edge 22 where the outer margin of the deflector shield 56 is clamped between the one-piece container 10 of this embodiment and the container lid 28. In radial section this deflector shield 56 forms a circular arc shaped vault. The apex circle 57 of the vault which likewise has the shape of a circular arc, and of which two points are to be seen in FIG. 2, has a diameter which corresponds approximately to the mean value between the inner and outer diameters of the screen-like major portion of the deflector shield 56.

As shown in FIG. 1, a plurality of nozzles 58 are installed in the lower part 12 of the container 10, offset at regular angular spacings. They are directed obliquely inwardly and upwardly and adapted to be supplied through conduits 60 with liquids to moisten, polish, and/or coat material C contained in the container 10. As shown in FIG. 2, corresponding nozzles 58 are installed in the upper portion of the marginal bead 42. They are directed obliquely outwardly and upwardly.

Together with the container lid 28 the container 10 of the fluidized bed apparatus according to FIG. 2 completes the shape of a sphere and, therefore, is adapted to resist relatively high internal pressure, such as may occur if solvents explode. A container jacket such as shown in FIG. 1 is not necessary with the embodiment according to FIG. 2. For this reason the gas outlet opening 26 is formed in the container lid 28.

At diametrically opposed locations two axle journals 84 project away from the container 10 shown in FIG. 2, their common axis constituting a horizontal pivot axis D. The axle journals 84 are supported in posts 86 and the latter are fixed to a lift car 20 which otherwise corresponds to the one shown in FIG. 1. At one of the posts 86 there is a gear transmission 88 to be driven manually so as to pivot the container 10 together with the container lid 28 about the horizontal pivot axis D, for instance, if thorough cleaning is required when there is a change in product.

Figure 3:
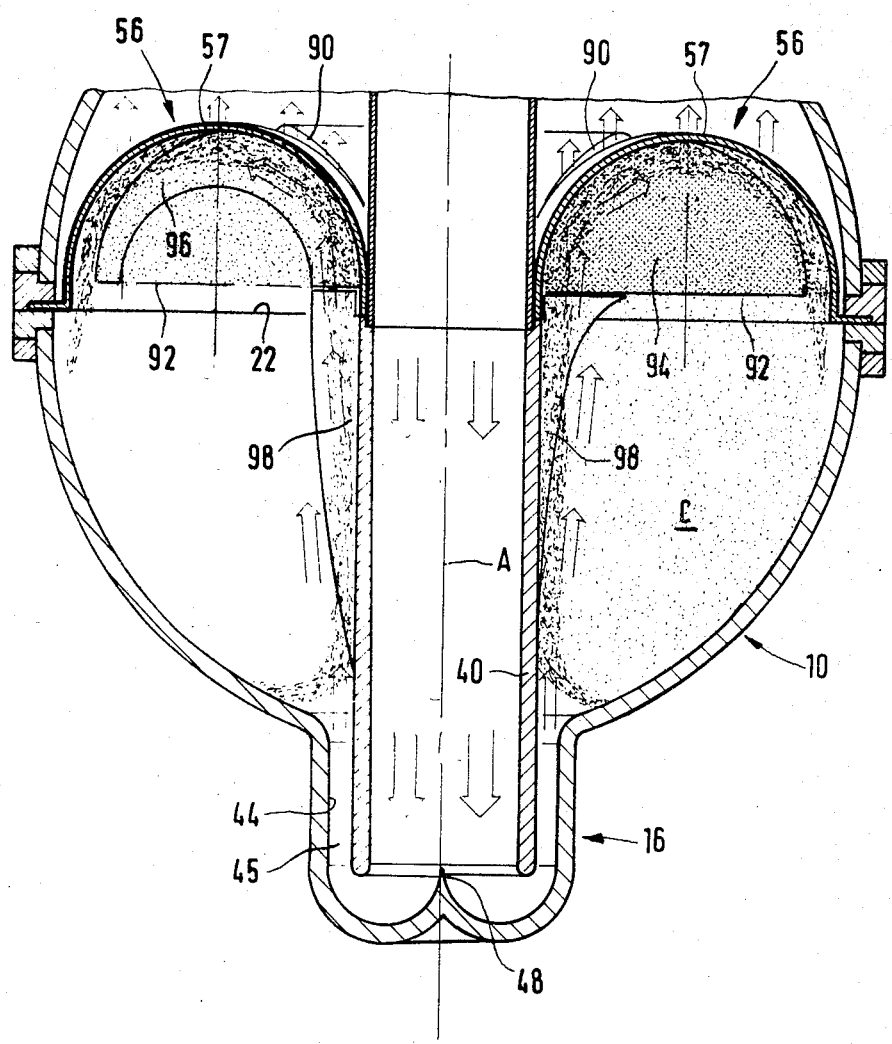
FIG. 3 is an axial section through parts of a fluidized bed apparatus according to a third embodiment.
Figure 4:
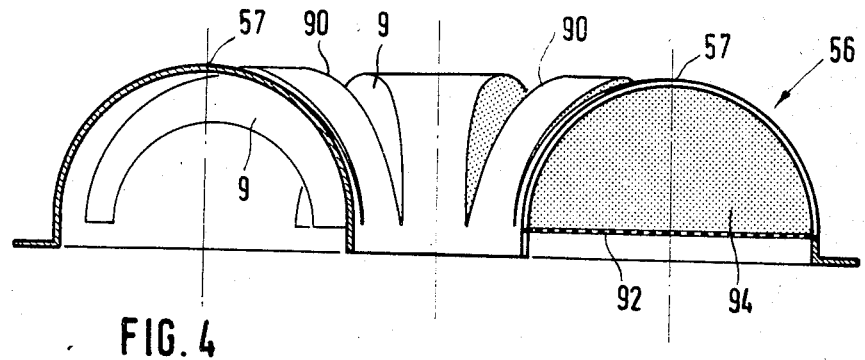
FIG. 4 is an axial section through a structural group of FIG. 3.
Figure 5:
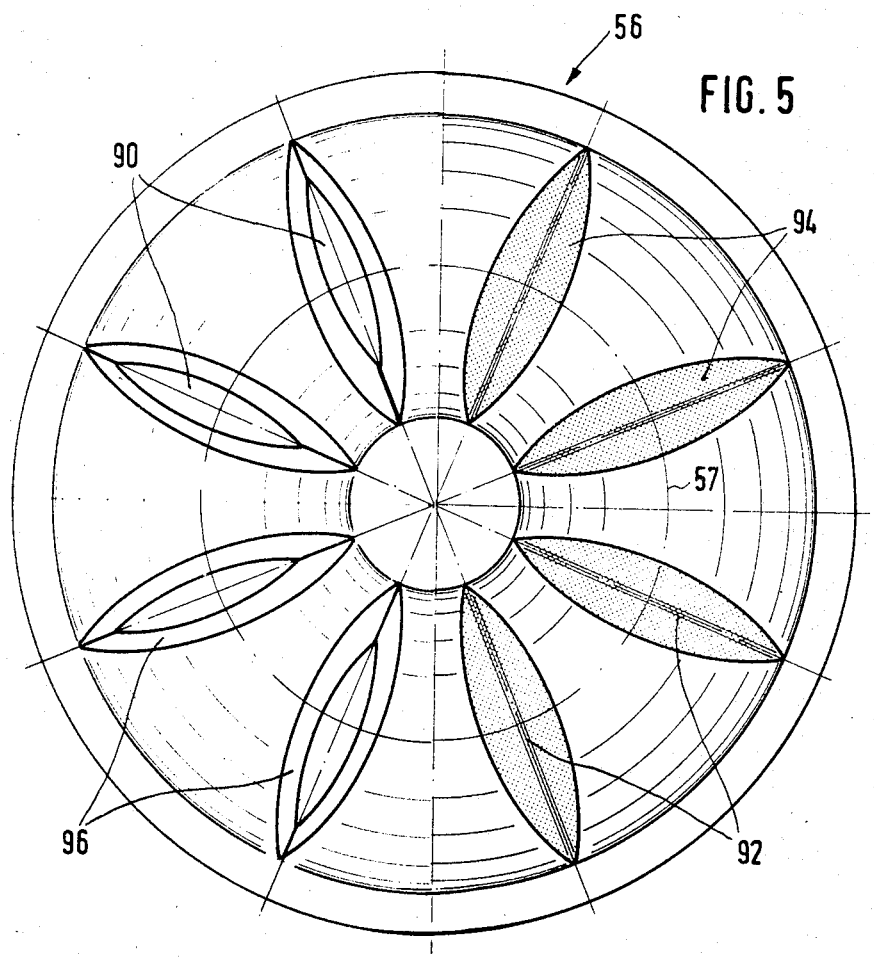
FIG. 5 is the top plan view belonging to FIG. 4.
Figure 6:
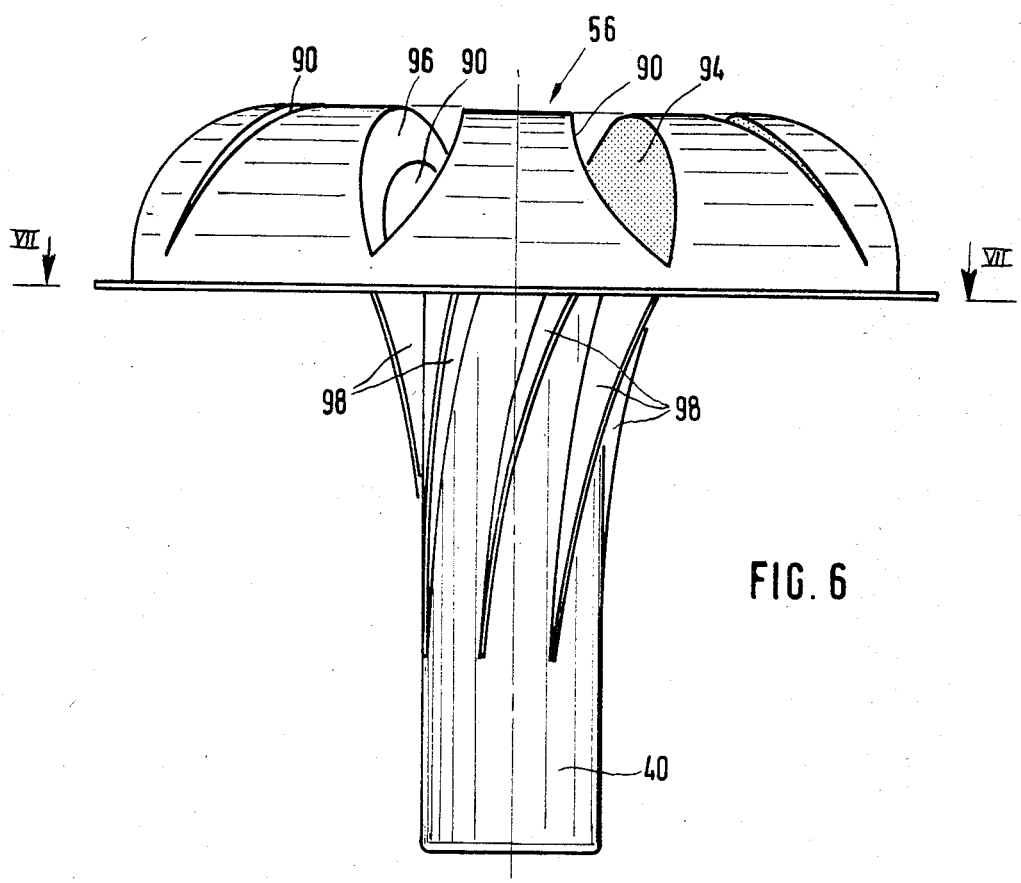
FIG. 6 is a supplemented side elevational view of the structural group shown in FIG. 4.
Figure 7:
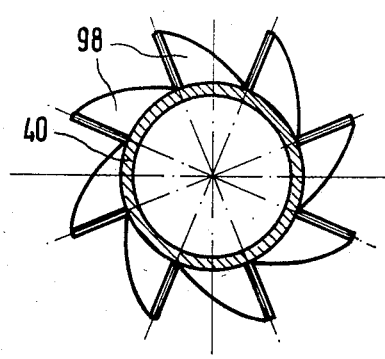
FIG. 7 is a section along line VII—VII of FIG. 6, FIGS. 3 to 6 each presenting two different variants of the third embodiment, at the right and left sides.

According to FIGS. 1 and 2 the container 10, including the associated dish 16 as well as the lid 28 are made of metal, preferably stainless steel. FIG. 3, on the other hand, shows an embodiment of the fluidized bed apparatus having the container 10 and its dish 16 made in one piece of glass and also having a glass lid 28.

The deflector shield 56 according to FIGS. 3 to 7 is made of stainless steel and forms a higher vault, as compared to FIG. 2, which is almost a semicircular vault in radial section. Elongated recesses 90 are cut in radial direction in this vault. If one interconnects the radially inner and outer ends of each recess 90, an approximately horizontal longitudinal axis 92 is obtained. The longitudinal axes 92 of all recesses 90 lie in a common horizontal plane.

In the case of the variant shown in the right half of FIGS. 3 to 6 each recess 90 contains a screen insert 94 which is tightly connected to the edges of the recess and bent in V-shape along the longitudinal axis 92. The space enclosed by each screen insert 94 and open to the top has a configuration similar to a slice of an orange. The variant shown at the left in FIGS. 3 to 6 does not have the recesses 90 lined with screen inserts but instead defined all around by a downwardly extending apron 96 each.

Fins 98 are formed at regular angular spacings at the outside of the plunger pipe 40. They begin a short distance above the annular space 45 and extend up to one of the longitudinal axes 92. In radial direction, the fins 98 have a height zero at their lower ends, while at their upper ends the height corresponds approximately to one fourth of the length of the respective longitudinal axis 92. The fins 98 may be helically formed in the same sense, as shown particularly in FIGS. 6 and 7. At any rate the fins 98 have such an outline that they will deflect upwardly flowing material C from the recesses 90.

All embodiments shown have in common that, in operation, a gas, such as heated, dry air is directed from above into the plunger pipe 40, then flows downwardly through the same at a velocity of, for instance, 20 to 40 m/sec. to be deflected in the dish 16 by about 180° and directed upwardly in the annular space 45. The flow velocity of the gas in the narrowest region of the annular space 45 is at least 20 m/sec., preferably between 30 and 60 m/sec. The gas then flows upwardly in a rather restricted area around the plunger pipe 40 or its shell, fluidizing the material C contained in the container 10 at least in this area.

With both variants of the embodiment according to FIGS. 3 to 7 the upwardly flowing material C is channelled by the fins 98 and given a screw-thread-like motion if the fins are helical.

Part of the gas will flow around and the other part through the deflector shield 56, depending on the particular design thereof (FIG. 1), or all of the gas will flow through the deflector shield (FIGS. 2 to 7). The gas leaves the container 10 through the gas outlet opening 26, while the flowing material is deflected outwardly by the deflector shield 56 and then flows down along the wall of the container 10, to be caught once more by the gas stream close to the upper edge of the dish 16, and entrained upwardly in a central hose-like flow formation.

Upon treatment of the material C, the container 10 is emptied by opening the discharge nozzle 55, shown in FIG. 1, and pneumatically conveying the material C out of the container or by lifting the central bottom zone 46 of the embodiment shown in FIG. 2 so that the material C may trickle down by itself. With the embodiment according to FIG. 2 it is also possible to dump the material C out of the container 10 upon opening of the container lid 28 with corresponding upward pivoting of the deflector shield 56. With the embodiment according to FIGS. 3 to 7 the container 10 is emptied in the same manner.

I claim:

1. A fluidized bed apparatus for mixing, drying, granulating, pelleting, polishing and/or coating pulverous or granular material, comprising:
    a container, which is at least approximately rotationally symmetrical with respect to an at least approximately vertical container axis, and which has an upper edge;
    a plunger pipe projecting axially from above into the container and connectable to a gas source;
    dish means disposed below the plunger pipe for deflecting gas entering through the plunger pipe in an upward direction so as to fluidize material disposed within the container;
    a deflector shield which is at least approximately rotationally symmetrical all around the plunger pipe and which is disposed in an upper area of the container, for deflecting material, entrained upwardly by gas, in an outward direction, wherein said deflector shield has elongated recesses, each having an at least approximately radial longitudinal axis, said recesses each containing a screen insert to be permeable to gas at least in individual areas, and wherein said deflector shield forms and arc shaped vault which extends from said plunger pipe radially outwardly to the upper edge of said container, said vault having a circular apex, the apex diameter of which corresponds at least approximately to the mean value of the diameters of the plunger pipe and the upper container edge; and
    a gas outlet opening disposed above the deflector shield.

2. The fluidized bed apparatus as claimed in claim 1, wherein said screen inserts are bent in V-shape along the longitudinal axis of the associated recess.

3. The fluidized bed apparatus as claimed in claim 2, wherein each recess is defined by a downwardly extending skirt.

4. The fluidized bed apparatus as claimed in claim 1, comprising a plurality of fins extending upwardly along the plunger pipe, each fin terminating close to the longitudinal axis of one of the recesses so as to direct the material flowing upwardly into the areas of the deflector shield located between the recesses.

5. The fluidized bed apparatus as claimed in claim 4, wherein each fin extends radially outwardly from said plunger pipe a distance that increases gradually from bottom toward top.

6. The fluidized bed apparatus as claimed in claim 5, wherein said fins are helical.

7. The fluidized bed apparatus as claimed in claim 4, wherein said fins are helical.

8. A fluidized bed apparatus for mixing, drying, granulating, pelleting, polishing and/or coating pulverous or granular material, comprising:
    a container, which is at least approximately rotationally symmetrical with respect to an at least approximately vertical container axis, and which has an upper edge;
    a plunger pipe projecting axially from above into the container and connectable to a gas source;
    dish means disposed below the plunger pipe for deflecting gas entering through the plunger pipe in an upward direction so as to fluidize material disposed within the container;
    a deflector shield which is at least approximately rotationally symmetrical all around the plunger pipe and which is disposed in an upper area of the container, for deflecting material, entrained upwardly by gas, in an outward direction, wherein said deflector shield has elongated recesses, each having an at least approximately radial longitudinal axis, to be permeable to gas at least in individual areas, wherein each recess is defined by a downwardly extending skirt, and wherein said deflector shield forms an arc shaped vault which extends from said plunger pipe radially outwardly to the upper edge of said container, said vault having a circular apex, the apex diameter of which corresponds at least approximately to the mean value of the diameters of the plunger pipe and the upper container edge; and
    a gas outlet opening disposed above the deflector shield.

* * * * *